(12) United States Patent
Mirmotahari

(10) Patent No.: US 7,721,206 B2
(45) Date of Patent: May 18, 2010

(54) SYSTEMS AND METHODS FOR REMOTELY VIEWING PAGE LAYOUTS

(75) Inventor: Afshin Mirmotahari, Victoria (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 1303 days.

(21) Appl. No.: 11/210,203

(22) Filed: Aug. 23, 2005

(65) Prior Publication Data

US 2006/0044604 A1 Mar. 2, 2006

Related U.S. Application Data

(60) Provisional application No. 60/603,550, filed on Aug. 24, 2004.

(51) Int. Cl.
*G06F 17/00* (2006.01)
(52) U.S. Cl. ............ 715/274; 715/251; 715/277; 715/243; 715/246
(58) Field of Classification Search .......... 715/277, 715/243, 246, 274, 251
See application file for complete search history.

(56) References Cited

U.S. PATENT DOCUMENTS

| | | | |
|---|---|---|---|
| 5,625,766 A | | 4/1997 | Kauffman |
| 6,314,452 B1 * | | 11/2001 | Dekel et al. ............. 709/203 |
| 6,624,908 B1 * | | 9/2003 | Petchenkine et al. ....... 358/1.15 |
| 7,379,209 B1 * | | 5/2008 | Dalton .................... 358/1.9 |
| 2001/0044868 A1 * | 11/2001 | Roztocil et al. ............ 710/129 |
| 2002/0054301 A1 * | 5/2002 | Iwai et al. .................. 358/1.2 |
| 2003/0007191 A1 * | 1/2003 | Herbert ..................... 358/462 |
| 2003/0020956 A1 * | 1/2003 | Goel et al. ................ 358/1.18 |
| 2003/0160975 A1 * | 8/2003 | Skurdal et al. .............. 358/1.2 |
| 2003/0167447 A1 * | 9/2003 | Hatta et al. ................ 715/517 |
| 2003/0234957 A1 * | 12/2003 | Ohara ....................... 358/1.15 |
| 2004/0190057 A1 * | 9/2004 | Takahashi et al. .......... 358/1.15 |
| 2005/0144256 A1 * | 6/2005 | Blumberg .................. 709/217 |
| 2006/0280360 A1 * | 12/2006 | Holub ....................... 382/162 |
| 2007/0127073 A1 * | 6/2007 | Goel et al. ................ 358/1.18 |

OTHER PUBLICATIONS

Realtimeproof Applications, Release Products Listing, www.realtimeproof.com/asp/download/default.asp.
Remote Director v3.0, Enhanced RDV3 system Offers a World of Features, www.icscolor.com.
Remote Director, "Sail into the Future with Monitor-Based Contract Proofing" www.icscolor.com.
ICS Integrated Color Solutions, Remote Direcotr, www.icscolor.com/products/director/.
Dialogue Interactive Soft Proofing, www.dalim.com/menu.html.
Dialogue, Interfactive Soft Proofing, www.dalim.com.
Kodak Polychrom Graphics, RealTime Proof Proofing Clinet—User Guide for Products using Proofing Client v5.2, www.kpgraphics.com.

* cited by examiner

*Primary Examiner*—Adam M Queler
(74) *Attorney, Agent, or Firm*—Nelson Adrian Blish

(57) ABSTRACT

A system and methods for remotely viewing a dynamically generated page layout is described. The page layout can represent a reader ordering of pages defined as part of a print production job. Alternatively, the page layout can represent an arrangement of pages based on information defined as part of a print production job.

2 Claims, 5 Drawing Sheets

SYSTEMS AND METHODS FOR REMOTELY VIEWING PAGE LAYOUTS

REFERENCE TO RELATED APPLICATION

This application claims priority from U.S. patent application No. 60/603,550 "Systems and Methods for Remotely Viewing Page Layouts", filed 24 Aug. 2004 which is hereby incorporated by reference herein.

TECHNICAL FIELD

This invention pertains to producing printed matter. More specifically the invention relates to remote, computerized access to information about producing printed matter.

BACKGROUND

Historically, facsimiles (or proofs) of final printed matter have been generated to enable the printer and print buyer to increase confidence in the final printed matter before the resources required to produce them have been committed.

Production of printed proofs, using less expensive resources (e.g. inkjet printer), was one method of proofing the content and printing processes. A proof could comprise a single page from a multiple page print job. Alternatively a proof could comprise a layout of an arrangement of pages from one or more print jobs. The layout could include selected pages that have specific proofing requirements (e.g. verifying content or verifying color). The layout could also include pages arranged as they would finally be printed to verify registration, layout or other aspects of the content or printing process. Production of printed proofs still included the cost of ink and paper consumables and presented logistical challenges for approval by reviewers located in one or more remote locations.

Soft proofing addressed some of the limitations of printed proofs by eliminating consumable costs and enabling remote and collaborative review of electronic proofs of the printed matter. The prior art teaches creation of electronic data (soft proof) representing a single page or imposed page layout. Independent remote viewing of the soft proof was enabled by delivering the soft proof to each reviewer. Delivering the soft proof to each location at one or more resolutions required for effective reviewing was problematic because of the computing and communication resources consumed and the latency in delivering the proof. Collaborative viewing was problematic with this method.

The prior art also teaches collaborative viewing of single pages where a server delivers a soft proof to multiple reviewers. The server rendered the same view of the page for each reviewer. By delivering only a part of the rendered page at the desired resolution the resource consumption and latency was reduced.

Remote and collaborative viewing of page layouts that is efficient and convenient remain as limitations in the prior art.

SUMMARY OF INVENTION

This invention provides systems and methods for remotely viewing a dynamically generated page layout on a computer system display. Viewing pages arranged in ways that depend on the user's intent provides convenience and efficiency to the user. Information about print jobs can be used to generate a layout and display it remotely. Alternatively, user input can be used to generate a layout and display it remotely. Preferred embodiments are based on client/server software architecture with components communicating using a network. Preferred client embodiments operate in a web-browser environment. A system according to one embodiment of the invention includes:

1. At least one print production software module, located at at least one server location. A print production software module provides the function of printing jobs, comprising multiple pages, while maintaining information about the jobs in a jobs database.
2. At least one jobs database module, located at at least one server location, for storing information about jobs.
3. At least one job information software module, located at at least one server location. A job information software module provides the functions of:
   communicating information about jobs from a jobs database to client software modules;
   receiving page layout view requests from a client software module, a request containing information sufficient to generate a page layout and identify the part of the layout of interest;
   generating a partial page layout image corresponding to a request; and
   communicating the partial page layout image to the client software module.
4. At least one client software module, located at at least one client location. A client software module communicates with a job information software module to provide the functions of:
   obtaining information about jobs;
   requesting a page layout view based on information about jobs;
   obtaining a partial layout image corresponding to the requested page layout view; and
   displaying the partial layout image.
5. At least one network to facilitate communication between modules operating on separate computer systems.

BRIEF DESCRIPTION OF DRAWINGS

In the drawings which illustrate non-limiting embodiments of the invention.

DETAILED DESCRIPTION

Throughout the following description, specific details are set forth in order to provide a more thorough understanding of the invention. However, the invention can be practiced without these particulars. In other instances, well known elements have not been shown or described in detail to avoid unnecessarily obscuring the invention. Accordingly, the specification and drawings are to be regarded in an illustrative, rather than restrictive sense.

Figure 1:
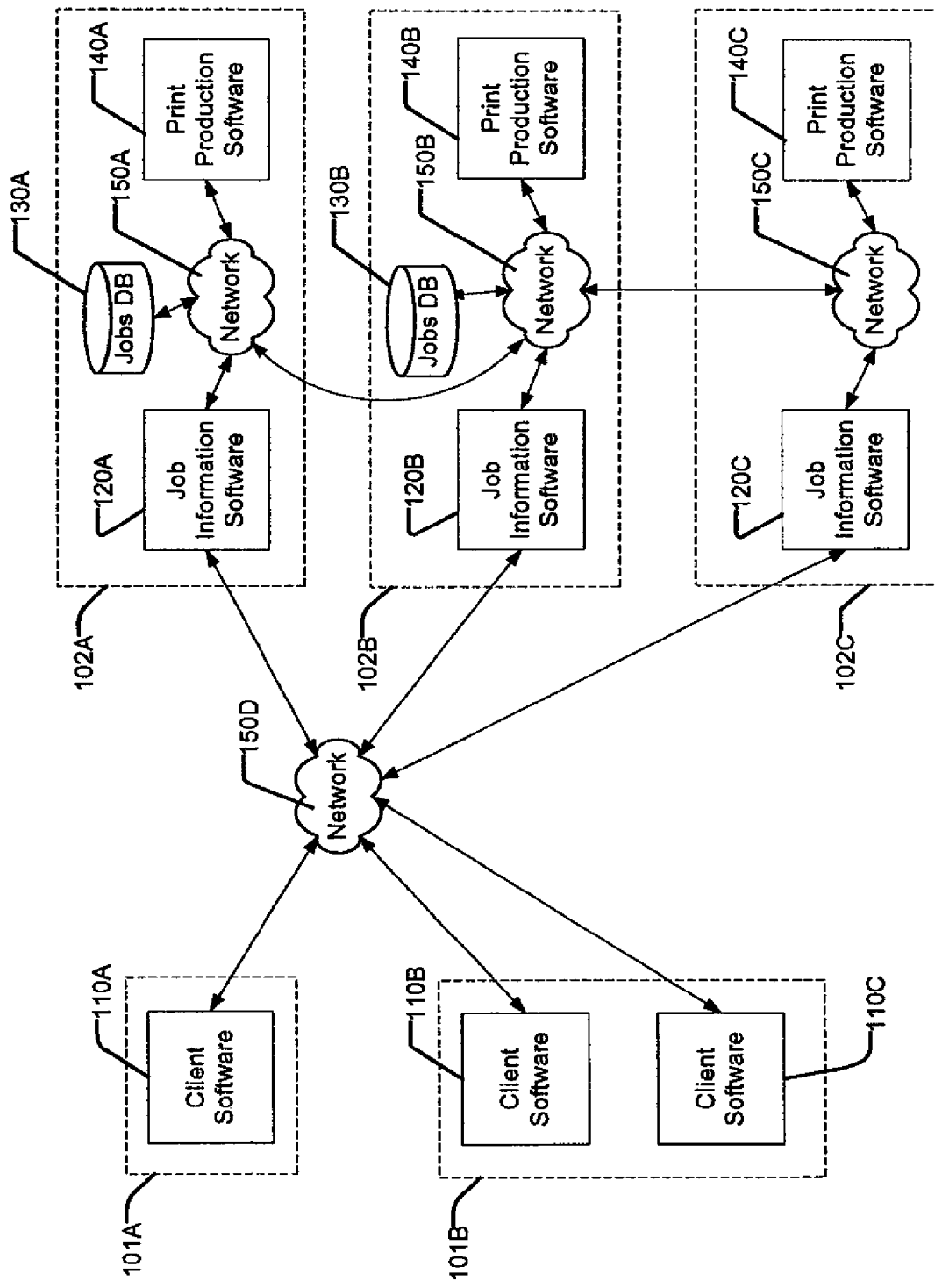
FIG. 1 is a block diagram illustrating the functional components of one embodiment of the invention.

FIG. 1 is a block diagram illustrating the components of one embodiment of the invention. This diagram depicts multiple client software 110 located at multiple client locations 101A-B. Client software 110A-C can be used by an employee, agent, or customer of a printing company that operates a print production software system. As an example, client software 110 enables a customer to upload files to be printed, to observe the status of a print job and to provide feedback on the processing of a print job. Remotely proofreading a page layout that is generated on demand is one novel aspect of the invention.

At a client location 101, client software 110 can be executed on a computer system. In a preferred embodiment, client software 110 executes within a web browser environment. Other environments, including native operating system application program environments, are possible. Client software 110 is capable of communicating with at least one job information software 120 located at a server location 102A-C. In some embodiments, client location 101 and server location 102 are the same.

Job information software 120A-C provides client software 110 with information about print jobs. Job information software 120 can be configured to communicate with multiple jobs databases 130A-B. Job information comprises at least information about pages to be printed as part of a print job, including at least the page description (e.g. PDF language) for each page in the job. Throughout the description, the term page is used to represent a unit of artistic content. It is understood that other formats of artistic content are within the scope of the invention.

Print production software 140A-C is responsible for printing jobs and maintains a jobs database 130A-B corresponding to jobs that have or are to be printed under its control. The nature and extent of job information stored in jobs database 130 depends on the embodiment of print production software 140. Job information may include information describing how to process the job, information about processing steps that have occurred, job security information, and other information. In some embodiments, job information software 120 communicates with print production software 140 to request or receive updates to job information.

A server location 102 can comprise one or more computer systems with software and database modules allocated amongst the computer systems. For example, a single computer system can host all three modules. Alternatively, each can be distributed amongst more than one computer system to balance the processing load. When modules are distributed amongst computer systems, networks 150A-D facilitate communication between the modules. Distribution amongst multiple server locations 102 is also possible. As an example, job information software 120B resides at location 102B and is in communication with jobs databases 130A-B via networks 150A-B. Similarly, print production software 140B and 140C are part of the same print production system and store job information at jobs database 130B via networks 150B-C. Similarly, client software 110 can also be hosted by a computer system at server location 102.

Network 150A-D can comprise equipment and communication links of a variety of types. Examples include wired or wireless types; and personal, local area or wide area types. A variety of communication protocols can also be utilized.

In one preferred embodiment of the invention, Creo's Prinergy® workflow software comprises print production software 140 and jobs database 130 module. In the same embodiment, Creo's Synapse Insite software comprises client software 110 and job information software 120 operating as internet-based client and server applications respectively.

Figure 2:
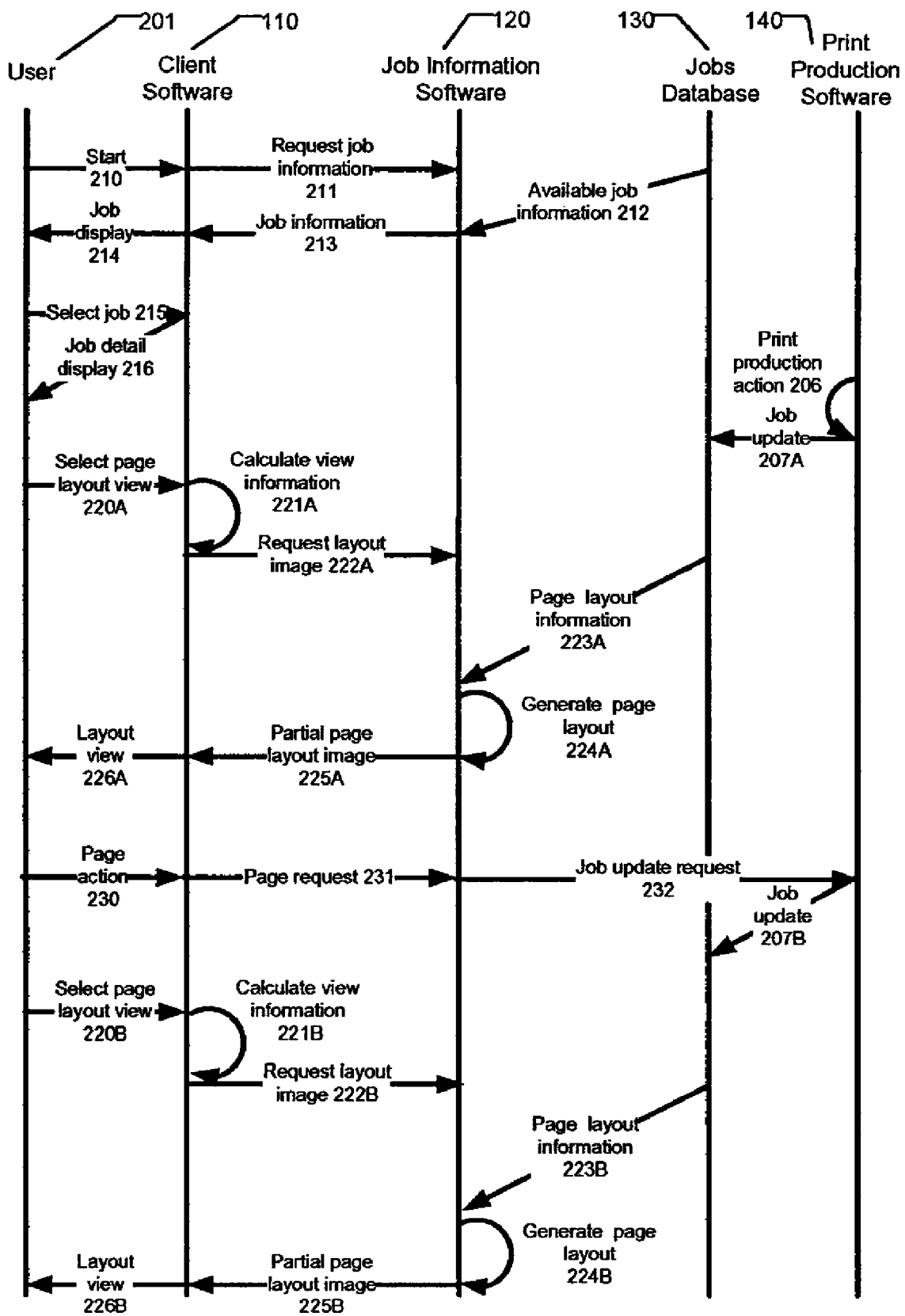
FIG. 2 is a diagram illustrating a sequence of interactions between functional components according to one embodiment of the invention.

FIG. 2 is a diagram illustrating an exemplary sequence of interactions between functional components according to one embodiment of the invention. User 201 operates the computer system that runs client software 110. User 201 interacts with the computer system through input and output devices. Exemplary input devices include a keyboard, mouse and microphone. Exemplary output devices include a display monitor and audio speakers. For example, user 201 provides input to computer system to start 210 client software 110. Start 210 input can include display preferences and the identity of job information software 120.

In response to start 210 input, the client software 110 presents an initial display on the monitor and sends a request job information 211 message to job information software 120. Information about user 201 can be supplied in the message (or later in response to a query by job information software 120) to determine how job information software 120 will respond to this and other messages. Access to features or jobs can be restricted. Other aspects of the interaction can also be determined based on a user 201 profile maintained by job information software 120 or print production software 140.

In response to request job information 211 message, job information software 120 obtains available job information 212, corresponding to multiple jobs, from one or more job databases 130. Job information 213 message, comprising some part of available job information 212, is sent to client software 110 in reply. Job information 213 includes, for each job, at least a job identifier and information about pages associated with the job.

Upon receipt of job information 213 message, client software 110 presents job display 214. The information available to display may be complex and thus can be presented and navigated in various ways. One presentation embodiment provides a summary of all jobs included in job information 213. User 201 can provide select job 215 input to request more information about a job. In response, client software 110 presents job detail display 216.

An exemplary job detail display 216 may include a summary of each page currently associated with the job. The page summary may include a thumbnail preview of the page, page description file information, page approval status, requested user activities, annotations supplied by other users, and print production processing information. A job detail display 216 may include other information about the job as be described below.

Assume one requested user activity includes a request to approve selected pages. Pages may be viewed individually as is taught by the prior art. Alternatively, and exemplary of the current invention, a layout of pages may be advantageously viewed where the layout is generated based on input from user 201. Examples of generated layouts include:

- a reader-spread layout where two pages are arranged adjacently with a left-page side and a right-page side;
- an arrangement of pages where two or more pages are arranged to fit a specified area; and
- a precise arrangement of two or more pages.

A reader-spread layout may be advantageous for viewing the pages similar to how the consumer will read the printed job. An arrangement of pages may be advantageous for viewing pages that will be printed on a single printed medium. A precise arrangement of pages may be advantageous for inspecting the geometrical relationship of pages and process control information that will be printed on a single printed medium. User 201 provides select page layout view 220A input to the client software 110 indicating the type of layout desired. For illustrative purposes, assume a reader-spread layout is selected.

In response, client software 110 performs calculate view information 221A activity corresponding to the initial view.

View information determines what part of the page layout is to be displayed. It also determines the resolution of the partial page layout image. First, client software 110 determines the available display area and the number of display pixels. Next, client software 110 determines the full size of the layout based on job information 213. In a reader-spread example, the page layout dimensions are determined from the maximum height of the pages and by adding the width of each page. If two pages have different dimensions, rules can be established to determine their relative vertical positioning (e.g. aligned bottoms, aligned tops, or centered). Next, client software 110 obtains the user 201 supplied zoom factor and display area position, relative to the complete page layout, to determine the dimension of the partial page layout that will be presented in the display. According to one embodiment of the invention, the initial display shows the complete page layout to simplify the activity. Finally, client software 110 calculates the required resolution of the partial page layout image based on the number of display pixels and the dimensions of the partial page layout.

Once view information is calculated, client software 110 sends the view information along with page identities as part of request layout image 222A message to job information software 120. In response, job information software 120 obtains page layout information 223A from jobs database 130, including at least information about the requested pages. Job information software 120 then performs generate page layout 224A activity. At least two alternative embodiments exist for the example activity. The two embodiments are described below. The activity completes with job information software sending partial page layout image 225A message to client software 110 in reply. The image may be optionally compressed before sending.

In response, client software 110 presents the image to the user as one part of layout view 226A. Upon examining layout view 226A, user 201 may choose an action associated with one or more pages. As an example, a page whose status is unapproved can be approved by providing page action 230 input. Client software 110 responds by sending page request 231 message, including the approval action and the page identity, to job information software 120 which in turn submits a job update request 232 message to print production software 140 on behalf of user 201. If the update to the job is allowed, job update 207B is recorded in jobs database 130.

Independent of job information software 120 activities, print production software 140 can update jobs database 130. As an example, print production action 206, representing creation of a new job, adding a new job file or completion of a processing step can occur at any time. It results in job update 207A being recorded in jobs database 130. According to one embodiment, the information in job update 207 is not utilized by job information software 120 until client software 110 sends request job information 211 message, which may be periodically or after specific client software 110 events. Other schemes, that provide a timelier update of job information to client software 110, are possible.

While examining layout view 226B, user 201 may determine that a different view of the page layout is required. For example, user 201 can zoom into a specific region of the current view, zoom out so that a specific area of the complete page layout occupies the display area or move the display area over the page layout while maintaining the current resolution. As an example, user 201 provides select page layout view 220B input to client software module 110 indicating a modified positioning of the display area over the page layout and a modified zoom factor. Client software 110 and job information software 120 respond as described above. Specifically, user 201 provides select page layout view 220B input to the client software 110 indicating the type of layout desired. In response, client software 110 performs calculate view information 221B activity corresponding to the initial view. Once view information is calculated, client software 110 sends the view information along with page identities as part of request layout image 222B message to job information software 120. In response, job information software 120 obtains page layout information 223B from jobs database 130, including at least information about the requested pages. Job information software 120 then performs generate page layout 224B activity. The activity completes with job information software sending partial page layout image 225B message to client software 110 in reply. In response, client software 110 presents the image to the user as one part of layout view 226B. Upon examining layout view 226B, user 201 may choose an action associated with one or more pages.

In addition to navigating a page layout, user 201 can also filter which color channels to present in the display by providing filter criteria as part of select page layout view 220 input. Information about color channels can be determined from information about pages obtained previously. According to one embodiment, pages initially processed by print production software are defined with a consistent color space. The color space may correspond to the color space of the device that will produce the final printed result. As an example, a printing press with CMYK process inks and selected spot inks may have a corresponding color space definition that includes those colorants.

According to one embodiment, job information software 120 supports color-filtered viewing by processing each page description into separate page description files, each corresponding to a single color channel defined by a color space. The color-separated page descriptions can be cached to improve subsequent page layout image rendering performance. When a page layout image is generated, page content corresponding to each view-enabled colorant is rendered to the color space of the display device (e.g. RGB). The resulting rasters are composited to form a single raster.

For example, assume a complete page layout view where each page description in the layout defines content with CMYK colorants, but only the cyan and magenta colorants are enabled in select page layout view 220. Four color separated page description are generated for each page. The resulting cyan and magenta page descriptions are rendered and coincident RGB pixel values (corresponding to the cyan and magenta color separations for a page) are combined to form the layout image.

Prior to the step of color separating the page descriptions, job information software 120 can match the colors in the page descriptions to a specific printing profile (e.g. corresponding to the final printing process). This can involve adjusting colorant values and/or substituting selected spot colorants with process colorant recipes. Color-matching profiles and recipes can be part of job information 213.

Reader-Spread Layout

Figure 3:
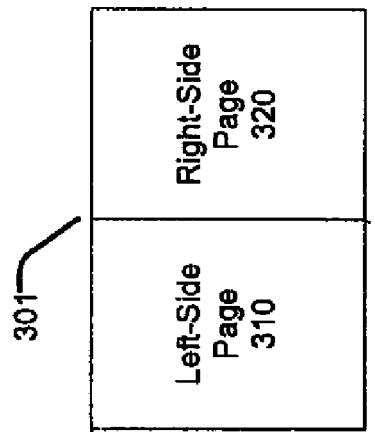
FIG. 3 is a diagram illustrating a reader-spread page layout.
Figure 3A:
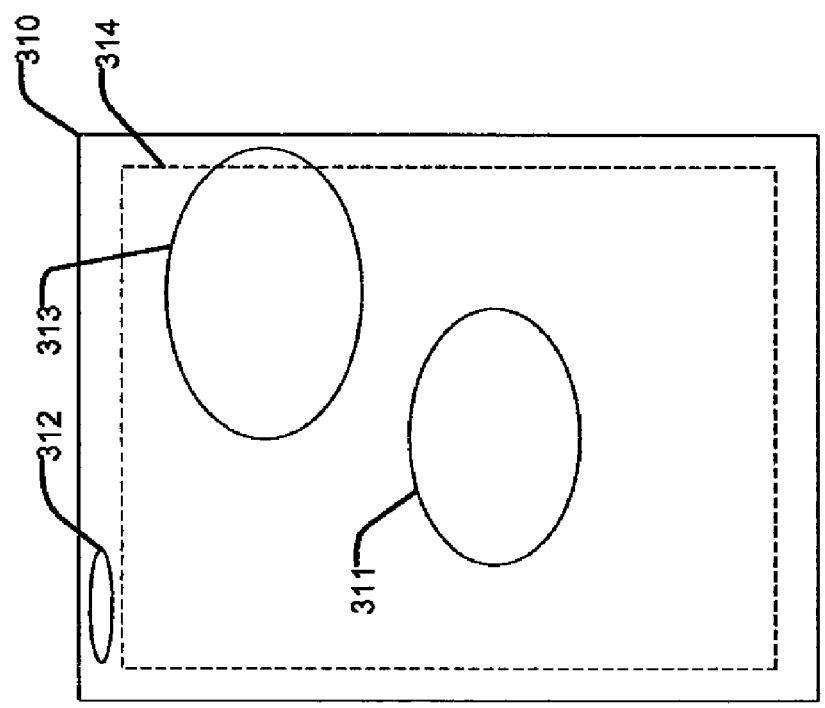
FIG. 3A is an expanded view of the left side page shown in FIG. 3.

FIG. 3 is a diagram illustrating a reader-spread page layout. Reader-spread page layout 301 comprises a left-side page 310 and a right-side page 320. An exemplary left-side page 310 is also illustrated in an expanded view in FIG. 3A. The page description for left-side page 310 is illustrated including a trim-box 314, which defines the geometry used to trim the printed result. The area between trim-box 314 and the boundary of page 310 is known as bleed. Page description content may be defined to display in the bleed. For example, page content 311 does not display in the bleed, page content 312 displays only in the bleed and part of page content 313 displays in the bleed. User 201 can request that layout view 226A or B include or exclude the bleed. Software modules consider this when calculating page layout dimensions and display positioning.

Figure 4:
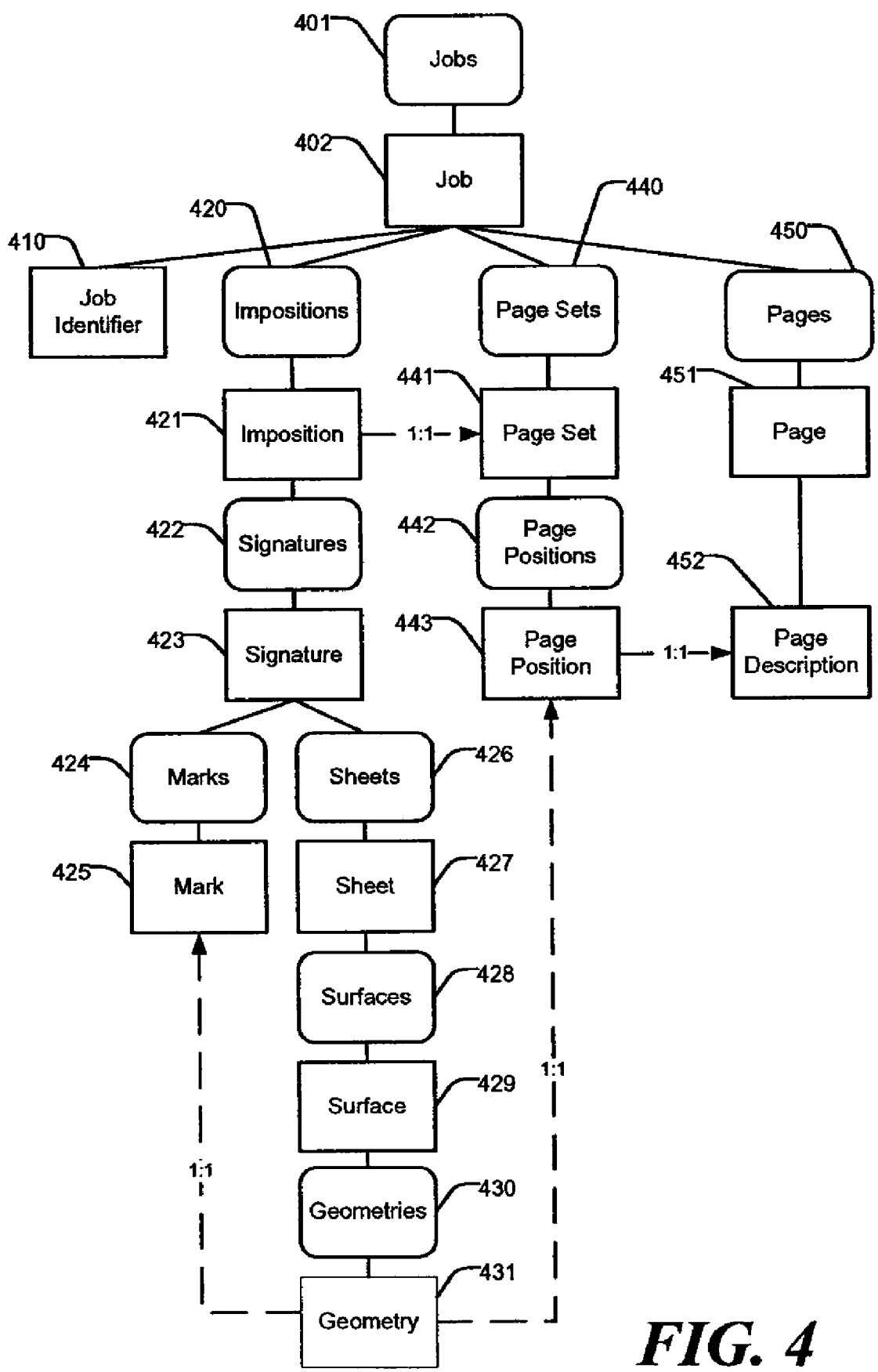
FIG. 4 is a diagram illustrating the structure of a jobs database according to one embodiment of the invention.
Figure 5:
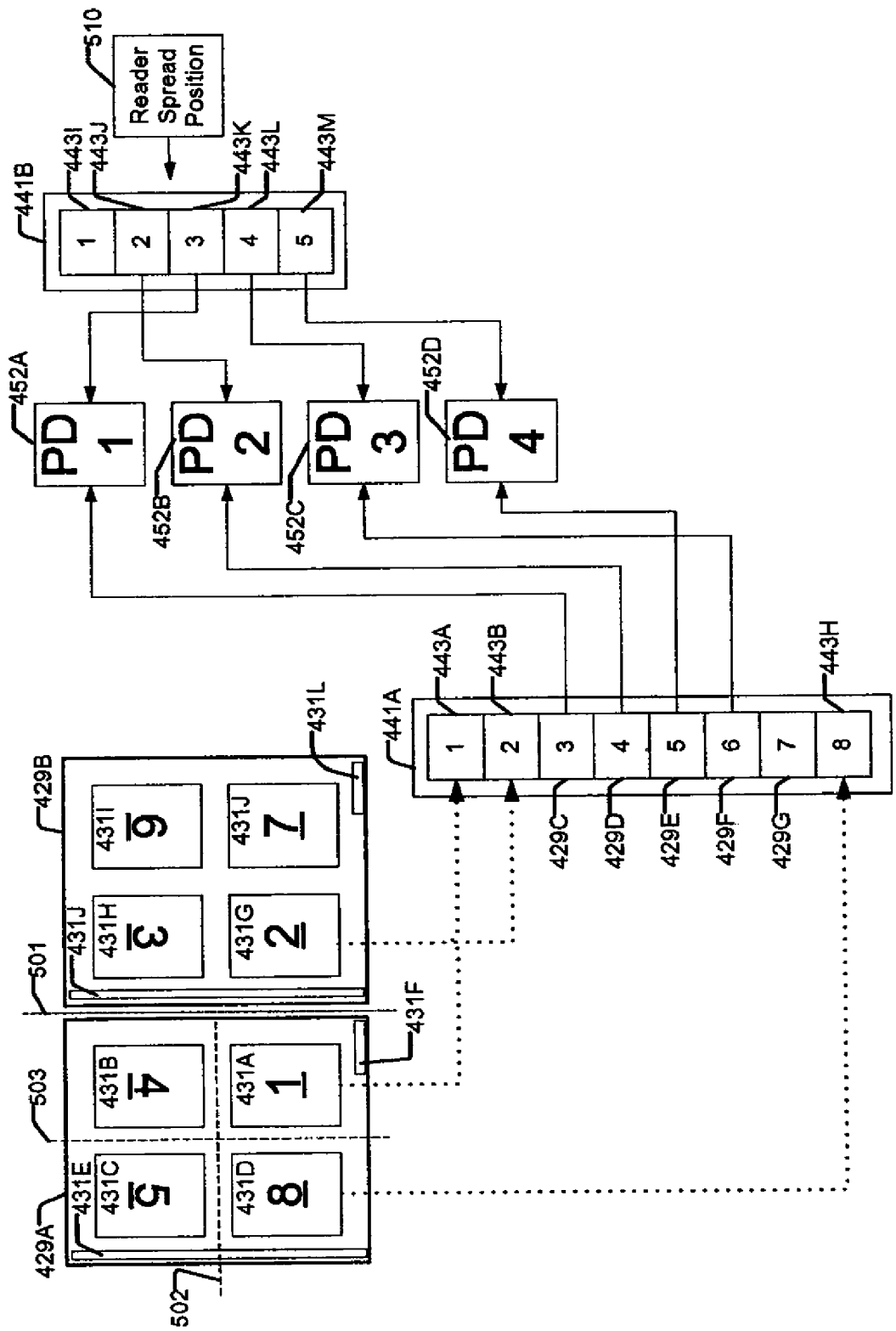
FIG. 5 is a diagram illustrating the relationships between aspects of an exemplary job's information.

A reader-spread layout of pages can be based on an arbitrary pair of pages or on an ordering of pages. FIGS. 4 and 5 illustrate aspects of the invention for page layouts based on an ordering of pages. FIG. 4 illustrates the structure of data corresponding to jobs database 130. FIG. 5 illustrates a portion of job information 213 corresponding to an exemplary job 402. Four page descriptions 452A-D are illustrated in FIG. 5. No ordering of these pages is implied. In fact, it may not be possible to determine a meaningful ordering from the page descriptions themselves. Pages may originate from separate files produced at different times or there may be duplicates of pages representing content that varies based on regions where the job is printed.

Page set 441B illustrates a page ordering data structure defined by job 402. It comprises an ordered set of page positions 443I-M. The ordering can imply a reader ordering or some other ordering. Each page position 443 can be associated with a page description 452. Alternatively, as in the case of page position 443I, no association exists. This may occur because the corresponding page description has not yet been submitted to or processed by print production software 140. Reader-spread position 510 is data, whose value is determined by user 201 input, indicating the position in page set 441 corresponding to a reader-spread view. Reader-spread position 510 identifies both a left-side and right-side page position. In the example of FIG. 5, the left-side page corresponds to page description 452B and the right-side page corresponds to page description 452A. Read-spread position 510 can be positioned at the ends of page set 441 so that only a left-side page or right-side page is included in the page layout.

Request layout view 222A-B can include reader-spread position 510 and the identity of page set 441. Alternatively, request layout view 222A-B can provide a client-generated page set and corresponding reader-spread position 510. User 201 can easily navigate a page set by providing next and previous inputs to client software 110.

As indicated above, at least two generate page layout 224 activity embodiments exist for generating a reader-spread page layout. The first embodiment comprises rendering a part of each page description and assembling the two partial images. The second method comprises assembling page descriptions into a reader-spread layout description and rendering part of the layout description. In a preferred embodiment, the first method is utilized.

The method of the preferred embodiment begins by job information software 120 rendering the page descriptions for each page. Only the parts of each page that correspond to the part of the layout that is visible in the display are rendered. This reduces latency and minimizes resource utilization. Client software 110 provides the coordinates of the region of each page to be rendered (in the page coordinate system) based on information about the pages and user 201 input. Two color-composited rasters corresponding to the visible parts of each page are then assembled by job information software into a reader spread to form one image. If the display is positioned over only one page then only one set of page descriptions is rendered.

The method of the alternate embodiment begins by job information software 120 assembling the page descriptions. Assembly must take into account user input, such as preference for viewing bleed. For example, client software 110 provides the bleed viewing preference and coordinates of the visible region of the page layout (in the layout coordinate system) based on information about pages and user 201 input. Job information software 120 renders part of each color-separated page layout description and composites the rasters to form one image.

Arrangement Layout

In one embodiment of the invention, the reader spread method is extended to create a different arrangement of two or more pages. As an example, jobs database 130 can contain information describing rules for dynamically generating a layout of an arbitrary collection of pages to fit a medium of some size. Exemplary rules can determine whether to rotate pages, determine spacing between pages, and determine spacing between the edges of a page and the medium. Any number of rules can be defined that guide software modules to determine the geometry of the page arrangement. Alternatively, software modules can share a function that is used to determine dynamic layouts. User 201 can influence the application of rules by providing input to client software 110. For example, rules can be organized into schemes (e.g. best fit, head to head) that produce different results with user 201 selecting the appropriate scheme.

As another example, the job can contain a pre-defined layout that specifies the precise position of pages in a page layout. An arrangement of pages that respects the relative positioning, but without respecting precise geometric transformations, can be derived by the software modules. This may be advantageous for conveniently viewing the pages that will ultimately be printed on a surface of a specific medium without wasting display real estate. In this embodiment, client software 110 provides the identity of a pre-defined page layout (see pre-defined arrangement layout below) to job information software 120, which in turn determines the associated pages and derives the page layout based on job information 213.

Precise Arrangement Layout

In one embodiment of the invention, the reader spread method is extended to create a precise arrangement of pages and optionally other content. Referring to FIG. 4, jobs database 130 comprises multiple jobs 401. Each job 402 (of multiple jobs 401) comprises a job identifier 410, multiple impositions 420, multiple page sets 440 and multiple pages 450. Each imposition 421 (of multiple impositions 420) may comprise multiple signatures 422 and comprises at least one signature 423 of multiple signatures 422. Each signature 423 comprises at least one sheet 427 (of a plurality of sheets 426). Each sheet 427 of plurality of sheets 426 includes at least one surface 429 of surfaces 428. A surface defines at least one geometry 431 of a plurality of geometries 430 for content defined elsewhere. Geometry 431 precisely defines the positioning of the associated content on the surface 429 (multiple surfaces 429A-G depicted in FIG. 5). It can also provide information enabling transformation of content to align with geometry 431.

Imposition 421 is associated with a page set 441 to define a page ordering for the imposition. Signature 423 can comprise marks 424 that appear on the printed material. Examples of a mark 425, used to control production processes, include information derived from the job (e.g. job name, date, and customer name), color calibration information and finishing information. Each geometry 431 is associated with a page position 443 selected from page positions 442 (which in turn is associated with a page description 452 of a page 451) or a mark 425. During print production, the position represented by geometry 431 is substituted with the associated content to produce an imposed layout for surface 429 that can be rendered.

FIG. 5 illustrates an exemplary job 402. One sheet 427 (not shown) is depicted as front surface 429A and back surface 429B. Surfaces 429A-B are positioned on opposite sides of sheet 427 so that their edges adjacent to line 501 align. Geometries 431A-L are illustrated to show content positioning. Geometry 431A is associated with page position 443A in page set 441A as indicated by a dashed arrow. Geometry 431A represents content positioned with no rotation on the lower right portion of surface 429A. Geometries 431A-L are based on the intended folding, cutting and binding of sheet 427 that will occur after printing. In this example, sheet 427 is folded first along line 502 so that front surface 429A is visible. Next, it is folded along line 503 so that geometry 431A is in front. When cut and bound, the pages will read in reader-order defined by page set 441A.

As with the other embodiments, color correction, color filtering and partial rendering based on user 201 input and job information 213 is performed. In another embodiment, determining page content for reader-spread or arrangement layouts can be derived from imposition 421. This has the advantage of including marks that are defined separately from the page description 452. In this embodiment, job information software 120 first generates an imposed layout from imposition 421. Then it extracts a portion of the imposed layout representing the boundary of a page and saves it as a de-imposed page description.

When double-sided impositions exist, another embodiment of the invention may advantageously enable simultaneous display of page layouts for each surface. In this embodiment, partial images for both surfaces are generated, each corresponding to the same portion (on opposite sides) of the medium that is visible in the display. The image rasters are composited by client software 110 prior to presentation. The images are presented to simulate the effect of viewing the images printed on a transparent medium. Based on user 201 input, client software 110 can alter either image's pixel values to facilitate comparison of content (e.g. to ensure that pages are aligned on the front and back surfaces). For example, the intensity of one image can be reduced highlight the features of the other image, or the colors of one image can be altered to colors that will contrast with the other image. "Software Based Proofing Method For Double Sided Printing", the title of U.S. Pat. No. 5,625,766, describing additional double-sided soft proofing methods is incorporated by reference herein.

The invention has been described in detail with particular reference to certain preferred embodiments thereof, but it will be understood that variations and modifications can be effected within the spirit and scope of the invention.

PARTS LIST

| | |
|---|---|
| 101A-C | client locations |
| 102A-C | server location |
| 110 | client software |
| 110A-C | client software |
| 120 | job information software |
| 120A-C | job information software |
| 130 | multiple job databases |
| 130A-B | job databases |
| 140 | print production software |
| 140A-C | print production software |
| 150 | computer system network |
| 150A-D | networks |

PARTS LIST -continued

| | |
|---|---|
| 201 | user |
| 206 | print product |
| 207A-B | job update |
| 210 | start |
| 211 | job information |
| 212 | job information |
| 213 | job information |
| 214 | job display |
| 215 | select job information |
| 216 | job detail display |
| 220A-B | page layout view |
| 221A-B | view information |
| 222A-B | layout image |
| 223A-B | page layout information |
| 224A-B | generate page layout |
| 225A-B | partial page layout |
| 226A-B | partial layout image view |
| 230 | page action |
| 231 | page request |
| 232 | job update request |
| 301 | reader-spread page layout |
| 310 | left-side page |
| 311 | page content |
| 312 | page content |
| 313 | page content |
| 314 | trim box |
| 320 | right-side page |
| 401 | multiple jobs |
| 402 | exemplary job |
| 410 | job identifier |
| 420 | multiple impositions |
| 421 | imposition |
| 422 | multiple signatures |
| 423 | signature |
| 424 | marks |
| 425 | marks |
| 426 | plurality of sheets |
| 427 | sheet |
| 428 | surfaces |
| 429 | one surface |
| 429A | front surface |
| 429B | back surface |
| 430 | plural of geometries |
| 431 | one geometry |
| 431A-L | geometries |
| 440 | multiple page sets |
| 441 | page set |
| 441A | page set |
| 441B | page set |
| 442 | page positions |
| 443 | page positions |
| 443A-M | page positions |
| 450 | multiple pages |
| 451 | page |
| 452 | page description |
| 452A-D | page descriptions |
| 501 | line |
| 502 | line |
| 503 | line |
| 510 | reader-spread position |

The invention claimed is:

1. A method for viewing a layout at a client location, the method comprising:

obtaining information about a page set at the client location;

communicating a layout view rawest to a server location based on the information about a page set;

generating a partial layout image at the server location based on the layout view request;

communicating the partial layout image to the client location;

displaying the partial layout image at the client location;

wherein the page set comprises a plurality of page descriptions accessible at the server location;

wherein the page set comprises an ordered plurality of page positions wherein each page position is capable of being associated with a page description of the plurality of page descriptions;

wherein communicating a layout view request comprises communicating:

information about the page set;

information identifying adjacent page positions in the page set for a layout;

information about a part of the layout to be viewed;

wherein generating the partial layout image comprises:

determining a reader-spread layout of page descriptions based on the information identifying adjacent page positions in the page set;

processing the reader-spread layout to produce the partial layout image;

wherein determining the reader-spread layout comprises:

obtaining page descriptions associated with the identified adjacent page positions in the page set;

determining a layout dimension based on the page descriptions;

determining a positioning of the page descriptions in relation to the layout dimension wherein the positioning is consistent with a reader-spread arrangement;

wherein processing the reader-spread layout to produce the partial layout image comprises:

identifying a part of each page description based on the information about the part of the layout to be viewed and the positioning of the page descriptions in relation to the layout dimension;

rendering the part of each page description to produce partial page images; and assembling the partial page images according to the reader-spread layout to produce the partial layout image.

2. A method according to claim 1 wherein the arrangement of the plurality of page descriptions is associated with a print job accessible at the server location.

* * * * *